Feb. 27, 1934.  W. L. NELSON  1,948,592

CAKE KNIFE

Filed June 1, 1933

INVENTOR,
WILLIAM L. NELSON
BY John H. Nelson
ATTY

Patented Feb. 27, 1934

1,948,592

UNITED STATES PATENT OFFICE 1,948,592

CAKE KNIFE

William L. Nelson, Chicago, Ill., assignor to Conrad Pistorius, Chicago, Ill.

Application June 1, 1933. Serial No. 673,871

5 Claims. (Cl. 294—1)

This invention relates to cake knives or cake servers, and has for its object the provision of such an instrument having a blade for insertion under a portion of cut cake to remove same by lifting or lateral withdrawal, wherein a handle is provided for the blade to extend rearwardly thereof and in offset or raised relation therefrom, so that a considerable amount of the cake portion supported on the blade, when being served, will be below the plane of the handle so as to bring the center of gravity of the load below or close to the plane of the handle. Thus the cake portion may be balanced on the blade in a manner hung from the handle when held in an operator's hand. A piercing element is provided to extend from the handle and partly over the blade for projecting into the cake portion upon the insertion of the blade thereunder for holding the cake portion on the blade.

Another object of the invention is to provide means whereby the piercing element may be operated in a limited manner by actuation of the handle to slightly clamp the cake portion on the blade upon its removal from the cake proper or when serving same, whereby the movement of the piercing element toward the blade when clamping slightly enlarges the opening in the cake portion made by the element. This prevents the cake portion from sticking to the piercing element to enable shaking the cake portion from the blade in serving without having to touch same with the fingers, although the piercing element substantially supports the cake portion on the blade when being carried thereon. It is another object of the invention to provide such an instrument with an operable handle in cooperable connection with the piercing element which is functionable upon being gripped, regardless of how firmly, to cause the slight clamping action of the piercing element.

An advantage of the instrument over that mentioned in the foregoing, is that its raised handle makes it very convenient to manipulate in laterally removing cut cake portions especially from common frosted layer cakes of the round type. The removing of cake portions in this manner greatly prevents the adjacent edges of the portion and cake proper from becoming jagged, particularly the edges of the top surface of the cake. Another object is to provide such an instrument having the novel features stated which is formed from a unitary piece of sheet metal so that it can be produced at a very low manufacturing cost.

Other objects and advantages including those stated will become apparent by reference to the specification and the accompanying drawing, in which.

Figure 1:
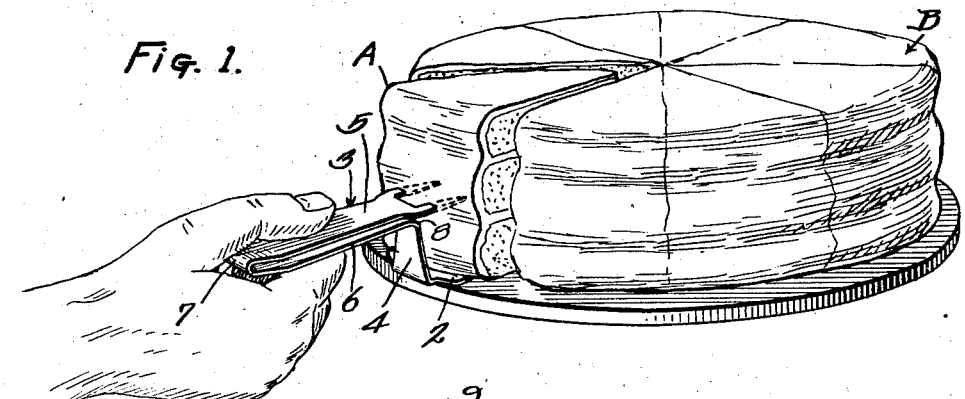
Fig. 1 is a perspective view of a round radially divided cake and illustrating the application of the cake knife embodying one form of the invention.
Figure 2:
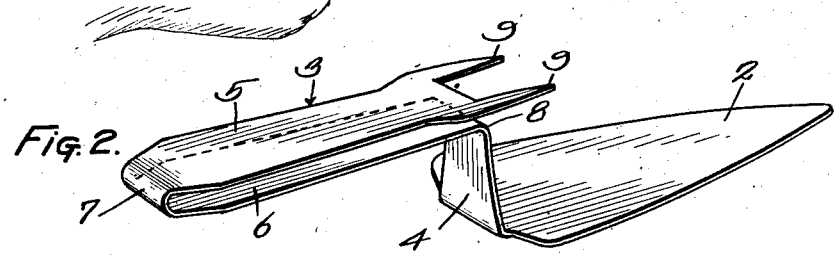
Fig. 2 is an enlarged perspective view of the cake knife as seen in Fig. 1.

Referring to Figs. 1 and 2, the cake knife embodying one form of the invention is provided with a wedge shaped blade 2 and the rearwardly extending handle 3 raised from the plane of the blade and being connected therewith by means of the short shank portion 4 extending upright from the rear end of the blade. Said portions of the instrument are integrally formed of sheet metal, and wherein the handle 3 comprises slightly spaced upper and lower normally parallel sections 5 and 6 respectively which are integrally connected at the rear end of the handle by the fold 7, the lower handle portion being integrally connected with the shank portion at its inner end forming an angular extension thereof from the bend 8. Extending from the inner end of the upper handle portion 5 are two spaced piercing elements or prongs 9, 9 forming a fork which projects partly over the rear end of the blade. Thus as the blade is inserted under a section or piece A of the round radially divided cake B, illustrated in Fig. 1 to show one application of the instrument, the prongs may be inserted into the end of the cake portion for holding same supported on the blade when it is being served. To enable laterally withdrawing or removing a portion of such a cake mentioned, wherein the sides of the wedge shaped portion being so removed would not scrape along the sides of the adjacent cake portions so as to prevent crumbling of the edges of said sides, the handle portions being resiliently connected may be pressed together to cause the prongs 9 to pinch or clamp the piece of cake on the blade. The fold portion 7 at the rear end of the handle may be hardened or the entire instrument may be composed of resilient or spring sheet material in providing a resilient connection between the upper and lower handle portions.

Figure 3:
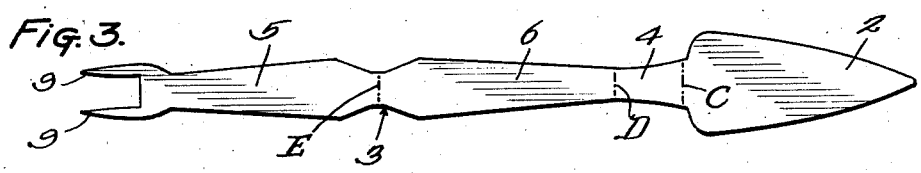
Fig. 3 is a view of the stamped blank of sheet metal from which the knife of the form shown in Fig. 2 is produced.

The form of the instrument just described is produced from the stamped blank shown in Fig. 3, wherein the parts of the instrument are arranged in developed formation. By sharply folding the blank at the dot and dash lines C and D at right angles in opposite directions, which defines the blade, shank and handle of the instrument, then by folding the blank at the dot and dash line E opposite to the direction of the fold at the line D until the handle portions 5 and 6 are brought into parallel spaced relation, the instrument is thus formed.

Figure 4:
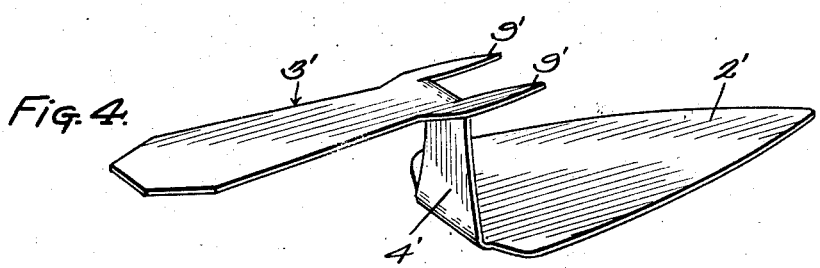
Fig. 4 is a perspective view of another form of the knife.
Figure 5:
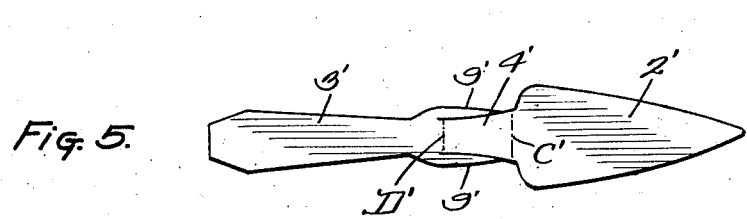
Fig. 5 is a view of the stamped blank of sheet metal from which the knife of the form shown in Fig. 4 is produced.

Another form of the invention is illustrated in Figs. 4 and 5 with parts like the form just described having similar numerals or letters with prime exponents. In this form the handle comprises a singular element with the prongs 9' extending from its inner end over and in fixed relation with the blade 2', wherein a piece of cake is not clampable on the blade when being carried thereon, although this form of the instrument is capable of functioning in a manner similar to that of which the first mentioned form is capable.

This form of the instrument is also produced from a stamped blank of resilient sheet metal, shown in Fig. 5, wherein the parts of the instrument are arranged in developed formation. The prongs 9' in the blank extend from the inner end of the handle portion 3' to project along the sides of the shank portion 4', so that when the blank is folded at the dot and dash lines C' and D' like in the other form, said prongs will project over the blade 2'.

Referring to the form of the instrument first mentioned, upon operating the handle 3 to cause the prongs 9 to clamp the cake portion on the blade 2, the openings in the cake portion made by the prongs are slightly enlarged which precludes the possibility of the prongs sticking in the cake portion and enabling shaking the portion from the blade when serving without having to touch same with the fingers. By virtue of the fact that the handle portions 5 and 6 are above the blade and slightly spaced from each other the operator is enabled to firmly grip the handle when carrying the cake portion in serving without greatly disfiguring same, because the prongs are limited in their clamping action toward the blade by the handle portions and a considerable amount of the cake portion is disposed between the prongs and the blade when clamped therebetween.

The raised handle also enables conveniently gripping same in laterally projecting the blade under the cake portion, applying the prongs, laterally removing the cake portion from the cake proper and laterally removing the portion parallel to a plate or tray in serving same thereon.

Referring now to the form of the instrument last described, the operator, after inserting the blade 2' under a portion of cake to be served, so that the prongs 9' project therein, may tilt the handle toward the blade by pressing downward upon the tray or plate on which the blade rests which causes the prongs 9' to bend downward in a clamping action. Thus the openings in the cake portion made by the prongs are enlarged to prevent the prongs from sticking to the cake when serving. The bending action of the handle 3' with respect to the blade 2' is made possible because the instrument in composed of resilient sheet metal.

Inherent advantages of the several structures described are the economical production of such instruments with simple blanking and forming dies, and a minimum of metal, at low manufacturing cost, and the possibility of properly serving cake portions in a sanitary manner without detracting from their appearance and with little skill or attention required of the manipulator.

Having thus described my invention, I claim:

1. In a cake serving instrument having a blade for engaging under so as to support a portion of divided cake to be served, a handle portion in limited resilient connection with the blade to extend rearward thereof and in offset or raised relation therefrom, a piercing element extending from the handle portion in its plane and over the rear part of the blade for engaging the cake portion so as to project therein upon the engagement of the blade under same for holding the cake portion on the blade when being served, whereby the handle portion is operable with respect to the blade to cause the piercing element to clamp the cake portion on the blade in slightly enlarging the opening in the cake made by the element.

2. In a cake serving instrument having a blade for insertion under so as to support a portion of divided cake to be served, a handle extending rearward of the blade in offset or raised relation therefrom and comprising upper and lower resiliently connected normally slightly spaced longitudinal portions of which the lower portion is integrally connected to the blade, and a piercing element extending from the upper handle portion and over the blade for engaging so as to project in the cake portion upon the insertion of the blade thereunder for slightly clamping said cake portion on the blade upon the pressing together of the handle portions into contact with each other whereby the opening in the cake portion made by the piercing element is slightly enlarged and the element maintained spaced above the blade when serving.

3. In a cake serving instrument formed of a sheet of resilient metal and having a blade portion for engaging under so as to remove a portion of a divided cake, the blade having an upward angular extension at its rear end to form a shank from which continues an extension to form a handle portion offset from and projecting rearwardly of the blade, and a prong extending over the blade and in cooperative integral connection with the handle for piercing the cake portion in holding same supported on the blade when being served, whereby upon tilting the handle portion with respect to the blade and theretoward causes the prong to clamp the cake portion for slightly enlarging the opening made by the prong in the cake.

4. In a cake serving instrument formed of sheet metal and having a blade portion for engaging under so as to remove a portion of a divided cake, the blade having an upward angular extension at its rear end to form a shank from which continues an extension to form a handle portion offset from and projecting rearwardly of the blade, a prong extending over the blade for piercing the cake portion as the blade is engaged thereunder, and means integrally associated with the handle portion and prong for providing a resilient connection therebetween in enabling limited operation of the prong to cause same to clamp the cake portion on the blade when being served, and whereby the prong is maintained spaced considerably above the blade.

5. In a serving instrument of the class described, formed of resilient sheet metal and having a blade portion with an offset narrow angular extension at its rear end to form a shank from which continues an extension to form a lower handle portion, said handle portion continuing into an extension folded back thereover in slightly spaced relation thereto to form an upper handle portion, and prongs extending from the upper handle portion to project over the blade.

WILLIAM L. NELSON.